(12) United States Patent
Kim et al.

(10) Patent No.: US 11,725,878 B2
(45) Date of Patent: Aug. 15, 2023

(54) REFRIGERATOR WITH SOUND REPRODUCING CAPABILITY

(71) Applicant: LG ELECTRONICS INC., Seoul (KR)

(72) Inventors: Seok Hyun Kim, Seoul (KR); Jun Sang Yun, Ansan-si (KR); Sang Oh Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 854 days.

(21) Appl. No.: 16/569,274

(22) Filed: Sep. 12, 2019

(65) Prior Publication Data

US 2020/0003486 A1 Jan. 2, 2020

(30) Foreign Application Priority Data

Jun. 12, 2019 (KR) .................. 10-2019-0069521

(51) Int. Cl.
*F25B 49/02* (2006.01)
*F25D 29/00* (2006.01)
(Continued)

(52) U.S. Cl.
CPC ............ *F25D 29/008* (2013.01); *F25D 11/02* (2013.01); *F25D 21/00* (2013.01); *G06N 20/00* (2019.01);
(Continued)

(58) Field of Classification Search
CPC ........ H04R 7/045; H04R 1/028; H04R 1/025; H04R 1/08; H04R 2440/01;
(Continued)

(56) References Cited

U.S. PATENT DOCUMENTS

| 9,860,636 B1 * | 1/2018 | Nongpiur ............... H04R 1/222 |
| 2012/0047918 A1 * | 3/2012 | Herrera ..................... F25C 5/04 |
| | | 62/347 |

(Continued)

FOREIGN PATENT DOCUMENTS

| KR | 10-0764279 B1 | 10/2007 |
| KR | 10-1245886 B1 | 3/2013 |

(Continued)

*Primary Examiner* — Md S Elahee
(74) *Attorney, Agent, or Firm* — Birch, Stewart, Kolasch & Birch, LLP

(57) ABSTRACT

A refrigerator with a sound reproducing capability is provided. The refrigerator may include a cabinet forming an exterior of the refrigerator and having an upper surface portion, a lower surface portion, a side surface portion, and a rear surface portion, a door coupled to the cabinet, a vibration module attached to an inner surface of at least one among the door, the upper surface portion, the side surface portion, the rear surface portion, and the lower surface portion, and a controller configured to control vibration of the vibration module. The vibration strength of the vibration module and power supplied to the vibration module may be determined by a trained model trained through machine learning, an area of artificial intelligence (AI). In addition, the refrigerator may include a communicator, and may operate in conjunction with an external device via 5G communication.

16 Claims, 6 Drawing Sheets

(51) Int. Cl.
  *G06T 7/60* (2017.01)
  *H04R 1/08* (2006.01)
  *G10L 15/22* (2006.01)
  *G10L 15/30* (2013.01)
  *H04R 7/04* (2006.01)
  *F25D 11/02* (2006.01)
  *F25D 21/00* (2006.01)
  *G06N 20/00* (2019.01)
  *H04R 1/02* (2006.01)

(52) U.S. Cl.
  CPC .............. *G06T 7/60* (2013.01); *G10L 15/22* (2013.01); *G10L 15/30* (2013.01); *H04R 1/025* (2013.01); *H04R 1/08* (2013.01); *H04R 7/045* (2013.01); *F25D 2700/06* (2013.01); *F25D 2700/12* (2013.01); *G10L 2015/223* (2013.01)

(58) Field of Classification Search
  CPC ..... H04R 2440/05; H04R 1/222; F25D 11/02; F25D 23/12; F25D 21/00; F25D 29/008; F25D 2700/06; F25D 2700/12; F25D 21/06; G10L 15/30; G10L 15/22; G10L 2015/223; G10L 15/005; G06N 20/00; G06N 5/003; G06N 3/0454; G06N 3/0445; G06N 7/005; G06N 3/0472; G06N 20/10; G06N 3/088; G06T 7/60; G01F 1/666; F25C 5/04
  USPC .............................................................. 62/129
  See application file for complete search history.

(56) References Cited

U.S. PATENT DOCUMENTS

2016/0223246 A1\* 8/2016 Siljeborn ................ F25D 21/06
2019/0259374 A1\* 8/2019 Kwon .............. H04N 21/42203
2022/0128388 A1\* 4/2022 Raduchel ................ G01F 1/696

FOREIGN PATENT DOCUMENTS

KR         10-1830372 B1     2/2018
KR          0150820 B1 \* 11/2019 ............. F25D 23/00
WO    WO-2019198281 A1 \* 10/2019 ............. F25D 23/00

\* cited by examiner

REFRIGERATOR WITH SOUND REPRODUCING CAPABILITY

CROSS-REFERENCE TO RELATED APPLICATION

This present application claims benefit of priority to Korean Patent Application No. 10-2019-0069521, entitled "REFRIGERATOR WITH SOUND-PLAYING CAPABILITY," filed on Jun. 12, 2019, in the Korean Intellectual Property Office, the entire disclosure of which is incorporated herein by reference.

BACKGROUND

1. Technical Field

The present disclosure relates to a refrigerator with a sound reproducing capability. More particularly, the present disclosure relates to a refrigerator which includes a vibration module disposed on an inner surface of at least one among a door of the refrigerator and surface portions of a cabinet, which enables vibration of the vibration module to be transmitted as sound through a surface to which the vibration module is attached.

2. Description of Related Art

Home appliances that interact with a user mainly receive signals through buttons and dials, and output signals through a 7-segment display or a display. Recently, with the development of voice input/output technology, some home appliances are using voice as an input/output means.

Thus, many home appliance devices are now equipped with microphones and speakers, and microphones and speakers are also installed in refrigerators and are used as input/output means. In this regard, a number of studies have been conducted regarding where a speaker should be installed in a refrigerator and how the speaker should be incorporated into a structure of the refrigerator.

Korean Patent Registration No. 764279, entitled "Sound device of a refrigerator", discloses a configuration in which the sound device of the refrigerator is built in a hinge assembly installed between a main body of the refrigerator and a refrigerator door, and in which a sound resonated in a hinge through a hinge speaker hole is transferred to the outside.

However, since the size of a hinge of the refrigerator is limited, the size of the speaker that may be disposed therein is also limited, and the intensity of the sound outputted by the speaker is determined depending on a size of a diaphragm of the speaker itself.

Meanwhile, Korean Patent Registration No. 1245886, entitled "Speaker mounting structure of a refrigerator", discloses a refrigerator configured to include a speaker, which is provided at one side of a door cap that forms an exterior of an upper portion of a refrigerator door and which is configured to output sound to the outside, and a speaker hole corresponding to a position of the speaker.

However, the size of the door cap decoration is also inevitably limited, and accordingly the size of the speaker that may be disposed therein is also limited. Thus, the intensity of outputted sound becomes lower, and functions other than outputting sound cannot be performed.

In addition, Korean Patent Registration No. 1830372, entitled "Refrigerator", includes a speaker assembly provided to face an upper surface of a lower door on a bottom surface of a refrigerator upper door and is configured to output sound to the outside, and discloses a configuration in which a speaker is seated so as to tilt at a predetermined angle from the bottom surface of the upper door toward the front of the upper door within a mounting space formed in a door.

Based on such a configuration, it is possible to prevent the speaker from being damaged due to moisture or water. However, since an output of a speaker disposed in a limited space of a lower door is still determined based on the size of a diaphragm included in the speaker, the output of the speaker with a limited size is inevitably limited.

Therefore, there is a need for a component capable of outputting sufficient sound despite having a small size that may be disposed in a limited space of a refrigerator, and for a method of effectively coupling the component to the refrigerator.

SUMMARY OF THE INVENTION

The present disclosure is directed to addressing the issue associated with the related art discussed above in which, when a speaker is disposed in a refrigerator so as to use sound as an output means to a user, the size of the speaker is inevitably limited due to a space where the speaker is disposed being limited.

The present disclosure is further directed to providing a means to prevent a sound reproducing device disposed in a refrigerator from deviating from a location where the sound reproducing device was originally installed.

The present disclosure is further directed to addressing the issue associated with the related art discussed above in which a function of a device capable of generating sound in a refrigerator in which frost may be generated is limited to only a speaker function, and to supporting a defrosting operation performed in the refrigerator.

The present disclosure is further directed to providing an operating method capable of preventing a cooling function of a refrigerator from deteriorating due to occurrence of a heat generation phenomenon when a sound reproducing device operates in the refrigerator.

The present disclosure is further directed to providing a configuration capable of preventing a glass panel disposed on a door of a refrigerator from being affected by an operation of a sound reproducing device disposed in the door.

The present disclosure is further directed to providing a method of use of a sound reproducing device capable of allowing information about food in a refrigerator to be easily transferred to a user outside.

The present disclosure is further directed to providing a configuration capable of addressing the issue in which, when sound is generated only toward the outside of a refrigerator, the sound fails to be transferred to a user as a target when the user has opened a door of the refrigerator and is looking into the refrigerator.

To achieve the above aspects, inventors of the present disclosure have conceived of a refrigerator capable of playing back sound using an inner plate or an outer plate of the refrigerator as a diaphragm, instead of a refrigerator in which a conventional speaker having a diaphragm is mounted.

In addition, in an embodiment of the present disclosure, there is provided a refrigerator in which a vibration module is disposed inside an outer surface portion of a door or inside an outer surface portion of a cabinet that forms an exterior of the refrigerator, and which is thereby capable of playing back sound using a component originally included in the refrigerator as a diaphragm.

In addition, a refrigerator with a sound reproducing capability according to an embodiment of the present disclosure may include a cabinet forming an exterior of the refrigerator, the cabinet having an upper surface portion, a lower surface portion, a side surface portion and a rear surface portion, a door coupled to the cabinet, a vibration module attached to an inner surface of at least one among the door, the upper surface portion, the side surface portion, the rear surface portion, and the lower surface portion, and a controller configured to control vibration of the vibration module.

Here, the vibration module may vibrate an inner surface of at least one among the door, the upper surface portion, the side surface portion, and the rear surface portion so as to output sound.

In addition, the refrigerator may further include a frame configured to mechanically support the vibration module such that the vibration module is fixed while being in contact with the inner surface of at least one among the door, the upper surface portion, the side surface portion, and the rear surface portion, and a front surface portion of the vibration module may be attached to the inner surface of at least one among the door, the upper surface portion, the side surface portion, and the rear surface portion via an adhesive member.

Here, the controller may be configured to operate the vibration module when performing a defrosting operation to remove frost generated in a part of the refrigerator.

In another embodiment of the present disclosure, the vibration module may be disposed at a plurality of positions among the upper surface portion, the side surface portion, the rear surface portion, and the lower surface portion, and the controller may be configured to operate a vibration module which is closest to a position where the frost is generated when performing the defrosting operation.

A refrigerator with a sound reproducing capability according to yet another embodiment of the present disclosure may further include a power regulator configured to regulate an amount of power supplied to the vibration module, and a temperature sensor configured to sense a temperature in the refrigerator. The power regulator may control the power supplied to the vibration module to be less than or equal to a threshold value, and may reduce the power supplied to the vibration module when a temperature variation in the refrigerator sensed by the temperature sensor is greater than or equal to a predetermined value.

Here, a storage space in which food is stored may be formed in the cabinet, a sensor configured to sense an introduction of food may be disposed in the storage space, and the controller may be configured to record a point in time at which the food is introduced and generate a warning signal using the vibration module when the introduced food has been stored in the storage space for a predetermined period of time or longer.

A refrigerator with a sound reproducing capability according to still another embodiment of the present disclosure may further include a communication unit capable of communicating with an external device via a wireless network.

Here, a storage space for storing food may be formed in the cabinet, an image sensor configured to sense a shape of stored food may be disposed in the storage space, and the controller may be configured to transmit the shape of the food sensed by the image sensor to the external device via the communication unit, and to receive, from the external device, a menu of possible dishes for cooking recommended according to a type of the food determined by the external device based on the shape of the food.

A refrigerator with a sound reproducing capability according to yet another embodiment of the present disclosure may further include a communication unit capable of communicating with an external device via a wireless network, and a microphone capable of receiving a voice of a user.

Here, the communication unit may transmit the voice of the user received via the microphone to an external device capable of recognizing a voice request and may receive a response to the voice request of the external device, and the controller may allow the response to be outputted via the vibration module.

In addition, a storage space for storing food may be formed in the cabinet, a transparent glass panel may be disposed on at least a partial surface of the door such that at least a part of the storage space is observable from outside of the refrigerator, the vibration module may be disposed below the glass panel, on an inner surface of the door, and a vibration absorbing member may be disposed between the glass panel and a portion of the door where the vibration module is disposed, and may prevent vibration generated from the vibration module from being transmitted to the glass panel.

A refrigerator with a sound reproducing capability according to still another embodiment of the present disclosure may include a storage unit forming a storage space for storing food, a door for opening and closing the storage space, the door having an outer plate forming a front exterior of the refrigerator, and a first vibration module disposed in contact with an inner surface of the outer plate of the door and configured to generate sound by vibrating the outer plate.

In addition, the refrigerator with a sound reproducing capability according to yet another embodiment of the present disclosure may further include a second vibration module disposed on an outer side of the storage unit and configured to generate vibration for removing frost in the storage unit.

Here, the second vibration module may perform an operation of generating vibration when the refrigerator performs a defrost function.

In addition, in a refrigerator with a sound reproducing capability according to still another embodiment of the present disclosure, a first vibration module may operate to play back sound outside the refrigerator via a door when the door is closed, and a second vibration module may operate to play back sound inside a storage space when the door is open.

According to embodiments of the present disclosure, sound may be used as an output means from a refrigerator to a user, and a portion of the refrigerator may be used as a diaphragm using a vibration module, instead of a general speaker including a diaphragm. Accordingly, the size of an area for a speaker to be disposed may be reduced.

Thus, since the size of an area for a speaker to be disposed in the refrigerator may be reduced, further components originally included in a refrigerator, such as a heat blocker may also be disposed. Accordingly, cooling efficiency of the refrigerator may be further enhanced.

In addition, sound may be played back using components which are originally included in a refrigerator, thereby reducing a manufacturing cost in comparison to the case when a general speaker is disposed.

Furthermore, in comparison to a refrigerator which uses a general speaker in which an output is inevitably limited since the size of the speaker is limited due to a space where the speaker is disposed being limited, a configuration with a much larger size may be used as a diaphragm. Accordingly, reproducing of sound with a greater intensity is possible.

In addition, according to embodiments of present disclosure, a vibration module may be stably fixed to a part of a refrigerator, and thus it is possible to prevent a sound reproducing device disposed in a refrigerator from deviating from a location where the sound reproducing device was originally installed.

In addition, according to embodiments of present disclosure, a defrosting operation performed by a refrigerator in which frost may be generated may be supported using a vibration module which is disposed in close contact with the refrigerator, and thus defrosting may be more efficiently performed.

In addition, according to embodiments of present disclosure, occurrence of a heat generation phenomenon may be prevented when a sound reproducing device operates, thereby preventing a cooling function of a refrigerator from deteriorating due to sound reproducing.

In addition, according to embodiments of present disclosure, a transmission of vibration of a vibration module to a glass panel may be prevented when the glass panel is disposed in a door and the vibration module is disposed below the glass panel, thereby preventing the glass panel from being affected by an operation of a sound reproducing device disposed in the door In addition, according to embodiments of present disclosure, information about food in a refrigerator may be easily transferred by voice to a user outside the refrigerator.

In addition, according to embodiments of present disclosure, sound may be played back inside a refrigerator when a user has opened a door of the refrigerator and is looking inside the refrigerator, and sound may be played back outside the refrigerator when the door of the refrigerator is closed. Accordingly, sound may be effectively transferred in accordance with actions of the user.

BRIEF DESCRIPTION OF DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
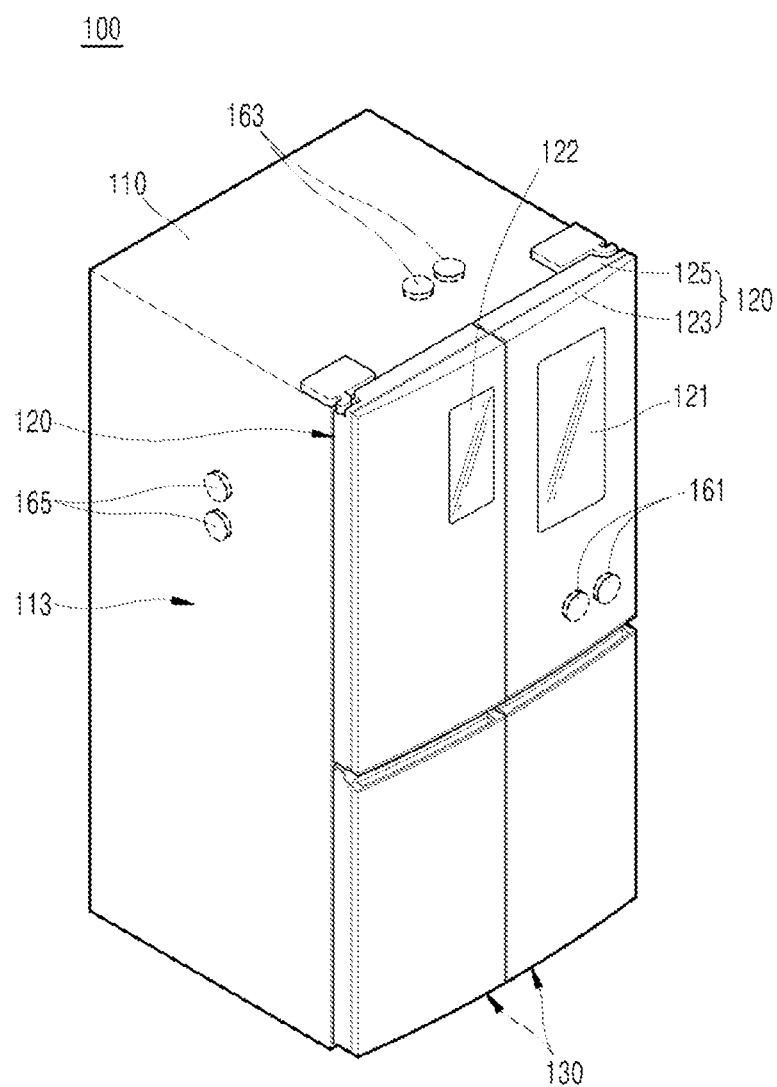
FIG. 1 is a diagram illustrating a refrigerator with a sound reproducing capability according to an embodiment of the present disclosure.

Hereinafter, the present disclosure will be described in detail with reference to the accompanying drawings. However, the present disclosure may be implemented in many different forms and should not be construed as being limited to the embodiments set forth herein. In order to clearly describe the present disclosure, parts that have no connection with the description are omitted from the embodiments. However, this does not mean that the omitted elements are unnecessary for embodying an apparatus or a system to which the idea of the present disclosure is applied. Further, like reference numerals refer to the like or similar elements throughout the specification.

In the following description, although the terms "first", "second", and the like may be used herein to describe various elements, these elements should not be limited by these terms. These terms may be only used to distinguish one element from another element. Further, as used herein, the singular forms "a," "an," and "the" may be intended to include the plural forms as well, unless the context clearly indicates otherwise.

In the following description, it will be understood that the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

FIG. 1 is a diagram illustrating a refrigerator with a sound reproducing capability according to an embodiment of the present disclosure.

A refrigerator 100 according to an embodiment of the present disclosure may include a cabinet 110 which forms an exterior of the refrigerator 100 and which has an upper surface portion, a lower surface portion, a side surface portion and a rear surface portion, doors 120 and 130 coupled to the cabinet 110, vibration modules 161, 163, and 165 attached to an inner surface of at least one among the surface portions of the refrigerator 100, and a controller (not shown) which controls vibration of the vibration modules.

The doors 120 and 130 may include an upper door 120 for horizontally opening and closing an upper refrigerating compartment, and lower doors 130 for opening and closing lower freezing compartments. On the upper door 120, a display 122 configured to display a state of the refrigerator 100 and transfer information to a user, and a glass panel 121 through which the refrigerator 100 may be viewed, may be disposed.

The upper door 120 may include an outer door 123 through which food that the user frequently removes may be put into the refrigerator 100, and an inner door 125 which may prevent an outflow of cooling air from a food storage space even when the outer door 123 is opened.

The refrigerator 100 may include the vibration modules 163 and 165 which are disposed on an inner surface of at least one of the upper surface portion, a side surface portion 113, and a rear surface portion of the cabinet 110. In addition, the vibration module 161 may be disposed on an inner surface of an outer plate that forms a front exterior of the doors 120 and 130. A vibration module may be disposed on a door or on one outer surface portion among the outer surface portions of the cabinet, or at a plurality of positions.

Here, the vibration modules 161, 163, and 165 may vibrate in response to a signal of the controller, and the above vibration may cause sound to be outputted by vibrating surfaces to which the vibration modules 161, 163, and 165 are attached. As shown in FIG. 1, the vibration module 161 attached to a door may vibrate an outer plate of the door so that sound may be outputted externally, the vibration module 163 attached to the upper surface portion of the refrigerator 100 may vibrate the upper surface portion so that sound may be outputted, and the vibration module 165 attached to the side surface portion 113 of the refrigerator 100 may vibrate the side surface portion 113 so that sound may be outputted.

Although not shown in FIG. 1 in detail, a frame may be disposed to mechanically support the vibration modules 161, 163, and 165 such that positions of the vibration modules 161, 163, and 165 may be fixed while being in contact with surfaces on which the vibration modules 161, 163, and 165 are disposed. A frame to support a vibration module may be coupled to an inner structure of a door and a structure of an upper surface portion, a side surface portion, or a rear surface portion of a cabinet, so as to fix a position of the vibration module.

Meanwhile, a vibration module may be disposed on an outer plate of a door below a transparent glass panel which is disposed on one surface of the door such that the inside of the refrigerator may be viewed. In this case, vibration generated from the vibration module may be transferred to the glass panel in addition to an outer plate portion of the door to which the vibration module is attached, and accordingly the glass panel may be vibrated and thus output undesired sound.

Thus, a vibration absorbing member may be disposed between the glass panel and the outer plate portion of the door to which the vibration module is attached, so as to prevent vibration generated from the vibration module from being transmitted to the glass panel. The vibration absorbing member may be selected from elastic bodies capable of performing a damping function. Due to the vibration absorbing member, it is possible to prevent vibration transferred to the outer plate of the door by the vibration module from being transferred to the glass panel.

Figure 2:
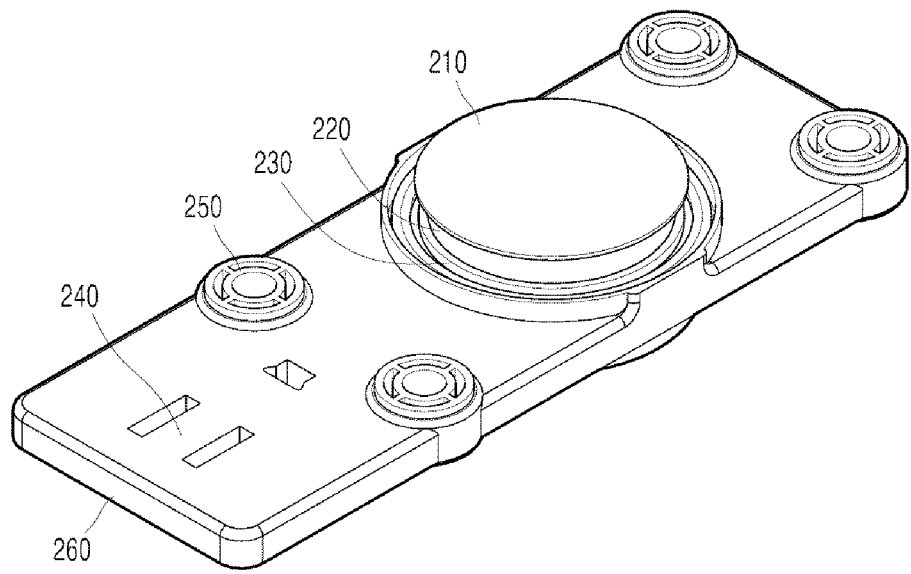
FIG. 2 is a diagram illustrating a vibration module which may be attached to a refrigerator with a sound reproducing capability according to an embodiment of the present disclosure.

FIG. 2 is a diagram illustrating a vibration module which may be attached to a refrigerator with a sound reproducing capability according to an embodiment of the present disclosure.

A vibration module 200 may include a base portion 260 in which components are mounted, a vibration surface portion 210 which transfers vibration in contact with a surface used as a vibration plate, a vibration driver 220 which drives the vibration surface portion 210, a holding portion 230 which holds a vibration component, a fixer 250 which is used to fix the vibration module 200 at a specific position, and a connector 240 which is used to receive an electric signal.

The vibration surface portion 210 is a front surface portion of the vibration module 200, and may be attached in contact with an inner surface of an outer plate that forms a front surface of a door using an adhesive member. In order for vibration of the vibration module 200 to be effectively transmitted and for desired sound to be outputted, the vibrating surface portion 210 is required to come into close contact with a surface functioning as a diaphragm with an appropriate pressure.

The vibration module 200 may be coupled to a frame via the fixer 250. The frame may mechanically fix the position of the vibration module 200 such that the vibration module 200 may continue to be in contact with the surface functioning as a diaphragm with an appropriate pressure.

The connector 240 may be, for example, a universal serial bus (USB) interface, and the vibration module 200 may communicate with a controller via the connector 240. In addition, the vibration module 200 may include a receiver capable of performing wireless communication, and may wirelessly receive sound data from another sound source.

Figure 3:
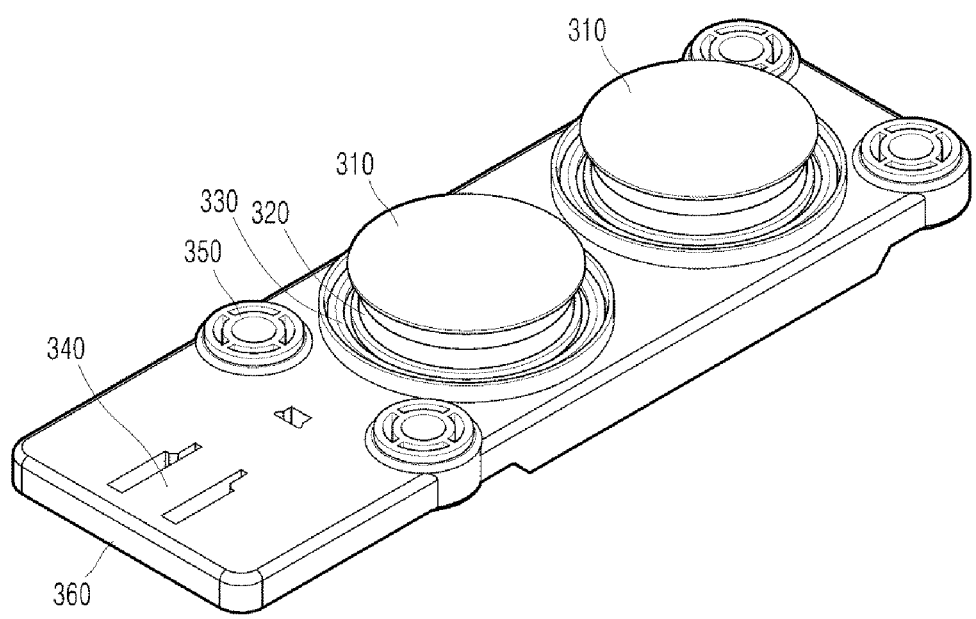
FIG. 3 is a diagram illustrating a vibration module which may be attached to a refrigerator with a sound reproducing capability according to another embodiment of the present disclosure.

FIG. 3 is a diagram illustrating a vibration module which may be attached to a refrigerator with a sound reproducing capability according to another embodiment of the present disclosure.

A vibration module 300 of FIG. 3 may include a base portion 360 in which components are mounted, a vibration surface portion 310 which transfers vibration in contact with a surface used as a vibration plate, a vibration driver 320 which drives the vibration surface portion 310, a holding portion 330 which holds a vibration component, a fixer 350 which is used to fix the vibration module 300 at a specific position, and a connector 340 which is used to receive an electric signal.

Unlike the vibration module 200 of FIG. 2, two vibration portions, instead of one vibration portion, are included in one module. When two vibration portions are included in one module as shown in FIG. 3, the two vibration portions may output the same sound, or may output different sounds in order to produce various sound effects. In addition, more than two vibration portions may also be included in one module, thereby producing a wider variety of sound effects.

Figure 4:
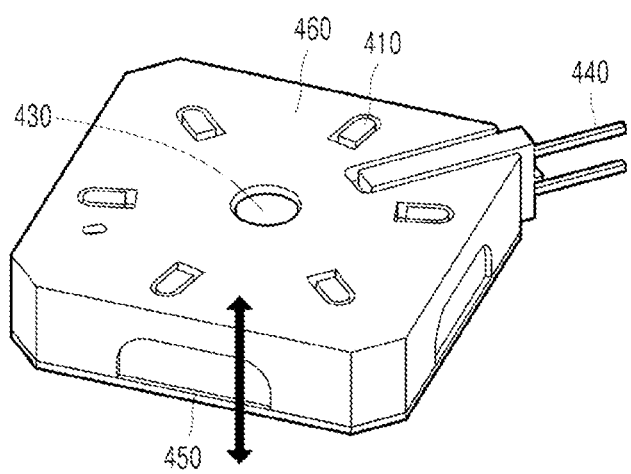
FIG. 4 is a diagram illustrating a vibration module which may be attached to a refrigerator with a sound reproducing capability according to another embodiment of the present disclosure.

FIG. 4 is a diagram illustrating a vibration module which may be attached to a refrigerator with a sound reproducing capability according to another embodiment of the present disclosure.

A vibration module 400 of FIG. 4 may include a base portion 450 in which a component is mounted, a central vibration portion 430, surrounding vibration portions 410, a case 460 which covers vibration portions, and an external connector 440, in a different manner from the vibration module 200 of FIG. 2 and the vibration module 300 of FIG. 3.

When a sound signal is transferred via the external connector 440, the central vibration portion 430 and the surrounding vibration portions 410 may vertically vibrate to transfer a signal of a sound wave for outputting sound.

In the vibration module 400 of FIG. 4, a vibrating portion may not be in direct contact with a surface functioning as a diaphragm, and a portion of the case 460 may be in close contact with a surface functioning as a diaphragm. In this state, the central vibration portion 430 and the surrounding vibration portions 410 may vertically move so as to transfer vibration.

Meanwhile, an exothermic reaction may occur in the above-described vibration modules when the vibration modules continuously vibrate, thereby hindering a normal operation of a refrigerator which is required to perform cooling. Thus, a vibration module installed in the refrigerator may be connected to a power regulator which regulates an amount of power supplied to the vibration module, and a temperature sensor which senses a temperature in the refrigerator may be additionally disposed in the refrigerator.

When the temperature sensor senses that the temperature of the refrigerator is higher than an original target temperature (for example, 1° C. to 3° C. of a refrigerating compartment, and −17° C. to −19° C. of a freezing compartment) while the vibration module is operating, the power regulator may reduce power supplied to the vibration module. In addition, the power regulator may maintain the supplied power to be less than or equal to a threshold value which is set in advance, so that excessive power may not be supplied to the vibration module.

A temperature that needs to be maintained in the refrigerator and the amount of power supplied to the vibration module may also be determined using machine learning (an area of artificial intelligence (AI)) based on data collected through various experiments conducted in advance and actual use cases.

In addition, a vibration operation of the vibration module for a sound output, and a vibration strength of a vibration module suitable according to properties of an attached panel, may also be determined using machine learning.

AI is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of AI that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Among the above machine learning algorithms, the ANN is a data processing system modelled after the mechanism of biological neurons and interneuron connections, in which a number of neurons, referred to as nodes or processing elements, are interconnected in layers.

ANNs are models used in machine learning and statistical learning algorithms inspired by biological neural networks (particularly of the brain in the central nervous system of an animal) in machine learning and cognitive science.

Specifically, ANNs may refer generally to models that have artificial neurons (nodes) forming a network through synaptic interconnections, and acquires problem-solving capability as the strengths of synaptic interconnections are adjusted throughout training.

The terms "artificial neural network" and "neural network" may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates connection weights; and (3) an activation function generating an output value from a weighted sum of inputs received from a previous layer.

The ANN may include, but are not limited to, network models, for example, a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network may include an input layer and an output layer.

In addition, a general multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

A DNN with a plurality of hidden layers between an input layer and an output layer may be the most representative type of ANN which enables deep learning, which is one machine learning technique.

An ANN may be trained using training data. Here, the training may refer to a process of determining parameters of the ANN by using the training data, to perform tasks such as classification, regression analysis, and clustering of inputted data. Such parameters of the ANN may include synaptic weights and biases applied to neurons.

An ANN trained using training data may classify or cluster inputted data according to a pattern within the inputted data.

Throughout the present specification, an ANN trained using training data may be referred to as a trained model.

Learning paradigms, in which an artificial neural network operates, may be classified into supervised learning, unsupervised learning, semi-supervised learning, and reinforcement learning.

Supervised learning is a machine learning method that derives a single function from training data.

Among functions that may be thus derived, a function that outputs a continuous range of values may be referred to as a regressor, and a function that predicts and outputs the class of an input vector may be referred to as a classifier.

In supervised learning, an ANN may be trained with training data that has been given a label.

Here, the label may refer to a target answer (or a result value) to be guessed by the ANN when the training data is inputted to the ANN.

Throughout the present specification, the target answer (or a result value) to be guessed by the ANN when the training data is inputted may be referred to as a label or labeling data.

Throughout the present specification, assigning one or more labels to training data in order to train an ANN may be referred to as labeling the training data with labeling data.

Training data and labels corresponding to the training data together may form a single training set, and as such, they may be inputted to an ANN as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the ANN may derive a correlation function between the training data and the labeling data. Then, through evaluation of the function derived from the ANN, a parameter of the ANN may be determined (optimized).

Unsupervised learning is a machine learning method that learns from training data that has not been given a label.

More specifically, unsupervised learning may be a training scheme that trains an ANN to discover a pattern within given training data and perform classification by using the discovered pattern, rather than by using a correlation between given training data and labels corresponding to the given training data.

Examples unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

An AI learning model as described above may be trained based on data labeled with heat emitted from a vibration module based on power supplied to the vibration module, and may be used to determine power required to be supplied to the vibration module.

In addition, a microphone may be installed in the refrigerator so as to sense an intensity of sound outputted to the outside based on vibration of the vibration module, and the AI learning model may be trained based on data labeled with the intensity of sound outputted to the outside based on a vibration strength of the vibration module and may also be used to determine a vibration strength according to an intensity of sound to be outputted to the outside.

Figure 5:
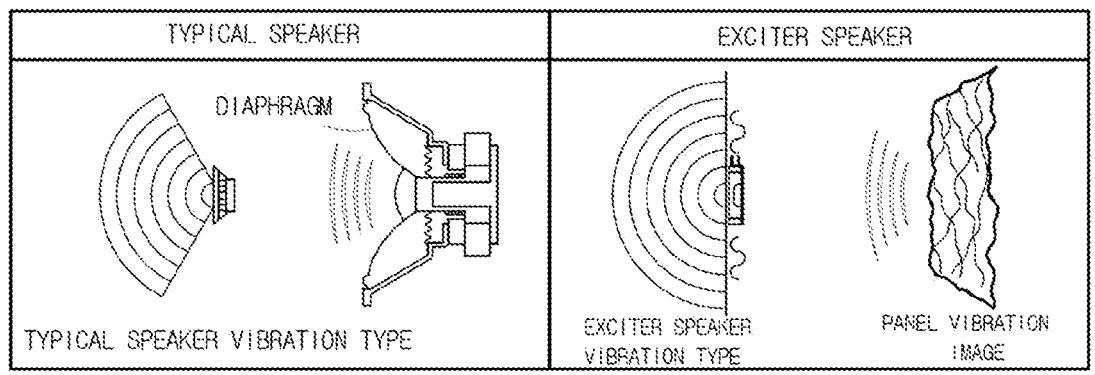
FIG. 5 is a diagram illustrating a difference between a typical speaker and an exciter speaker that is used in the present disclosure.

FIG. 5 is a diagram illustrating a difference between a typical speaker and an exciter speaker that is used in the present disclosure.

The typical speaker described in the left column has its own diaphragm, and sound is transmitted to the outside according to a movement of the diaphragm. In the above structure, the size of the diaphragm is determined based on the size of the speaker, and an output capability of a single speaker is limited by a structure of the speaker.

In contrast, the exciter speaker described in the right column does not include a diaphragm, and a vibration module is attached to an arbitrary panel, and the arbitrary panel is utilized as a diaphragm. Thus, it is possible to implement various output capabilities by changing a type of panels attached to the same small-sized vibration module.

As shown in a right image of the right column, when the vibration module attached to the panel vibrates, vibration of the vibration module may be transferred to the panel so that the panel may vibrate, thereby outputting sound.

Meanwhile, the exciter speaker may be used to perform functions other than a simple sound output function, by using the principle that vibration is transmitted to the panel attached to the vibration module in the exciter speaker.

For example, frost may be generated in a refrigerator, and may adhere to an inner surface of the refrigerator. In this example, cooling efficiency of the refrigerator may be significantly reduced. Thus, when frost is sensed, the refrigerator may perform a defrost function to melt frost, and the principle that a surface to which a vibration module is attached is vibrated by the vibration module may help such a removal of the frost. For example, when the defrost function starts to be performed in the refrigerator, the vibration module attached to the inner surface of the refrigerator may vibrate so that the frost may be separated from the inner surface, thereby more effectively removing the frost.

Strengthening of the defrost function using the vibration module will be described in more detail in another part of the detailed description.

Figure 6:
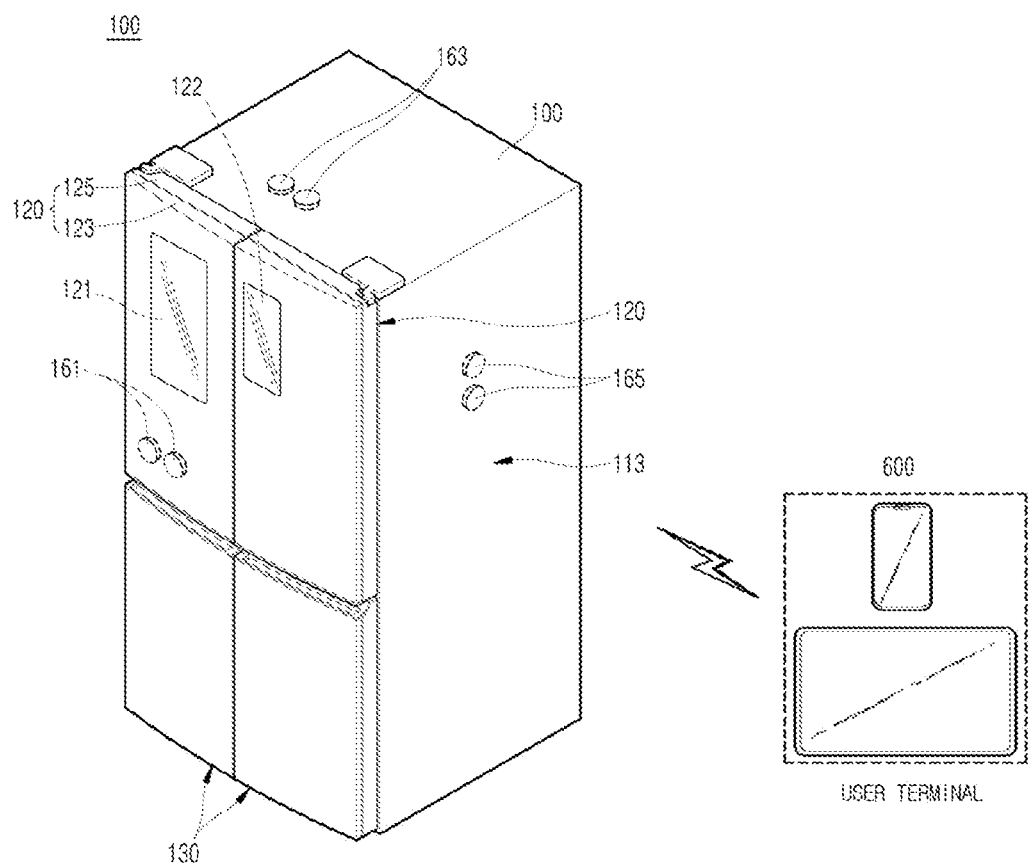
FIG. 6 is a diagram illustrating a configuration of a communication between a user terminal and a refrigerator with a sound reproducing capability according to an embodiment of the present disclosure.

FIG. 6 is a diagram illustrating a configuration of a communication between a user terminal and a refrigerator with a sound reproducing capability according to an embodiment of the present disclosure.

A refrigerator 100 may include a communication unit capable of communicating with an external device via a wireless network. The external device may be a user terminal 600, for example, a smartphone or a tablet. A communication scheme may include, for example, short-range communication technology such as Bluetooth™, radio frequency identification (RFID), infrared data association (IrDA), ultra wideband (UWB), ZigBee, near field communication (NFC), wireless-fidelity (Wi-Fi), Wi-Fi Direct, and wireless universal serial bus (wireless USB) technologies. In addition, various communication schemes, for example, wireless communication technology such as Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A), may also be applied.

The communication unit of the refrigerator 100 may receive sound data from the user terminal 600, and a controller may allow a vibration module to play back corresponding sound. In addition, which sound is outputted from the refrigerator 100 may be displayed on a display of the user terminal 600.

Also, the communication unit of the refrigerator 100 may transmit, to the user terminal 600, information about a type of food in the refrigerator, information about a state of food, and information about a recipe and recommended food based on ingredients in the refrigerator.

For example, a sensor (for example, an image sensor capable of sensing a shape of food) configured to sense an introduction of food may be disposed in a storage space for storing food within a cabinet of the refrigerator, and thus the controller of the refrigerator may record a point in time at which food is introduced.

When the introduced food has been stored in the food storage space for a predetermined period of time or longer, the refrigerator may transmit a warning alarm to a user terminal via the communication unit, or transmit a warning alarm sound signal itself, using the vibration module.

In another example, information about food in the refrigerator sensed by a sensor capable of sensing a shape of food may be transmitted via the communication unit to an external device such as the user terminal 600, and the external device may determine a type of food according to the shape of the food, and recommend a food menu that may be cooked using the existing food. The external device may transfer information about the recommended food menu back to the refrigerator, and the refrigerator may report the received information as sound using the vibration module.

Figure 7:
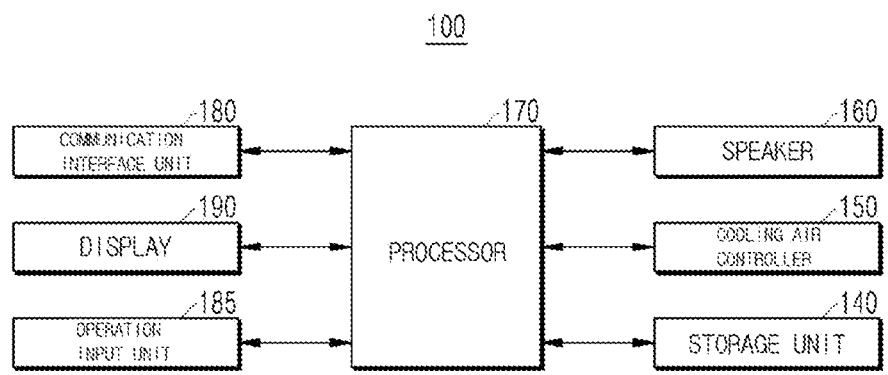
FIG. 7 is a block diagram illustrating a refrigerator with a sound reproducing capability according to an embodiment of the present disclosure.

FIG. 7 is a block diagram of a refrigerator with a sound reproducing capability according to an embodiment of the present disclosure.

A refrigerator 100 may include a storage unit 140 for storing food, a cooling air controller 150 configured to control cooling air in the storage unit 140, a vibration module or speaker 160 configured to transmit sound information, an operation input unit 185 configured to receive an input of a user's instruction, a display 190 configured to transfer information to a user on a screen, a communication interface unit 180 configured to communicate with an external device, and a processor 170 connected to the above components to control functions of the refrigerator 100.

The cooling air controller 150 may perform a function of maintaining a constant temperature in the storage unit 140, and the operation input unit 185 may function as an interface to receive a user command, for example, a selection of desired sound to be outputted using a speaker 160 and a desired temperature of the storage unit 140.

The speaker 160 may refer to a portion which is coupled to a vibration module and a panel of the refrigerator to which the vibration module is attached, unlike a general speaker, and which performs a function of outputting sound. The display 190 may perform a function of outputting, using an image, information required to be transferred to a user.

In addition to the components shown in FIG. 7, the refrigerator 100 may further include a microphone capable of receiving a voice signal from the outside. When a user generates a voice request to perform a specific operation (for example, "Tell me how to cook rolled-up eggs.") using the microphone, the refrigerator may transmit the voice request via the communication unit to an external device capable of recognizing a voice request, for example, the user terminal 600 or an AI speaker, and the external device may perform a process in response to the voice request. The external device may search for a recipe for rolled-up eggs and transmit the recipe back to the communication unit of the refrigerator, and the refrigerator 100 may transfer the corresponding information to a user by outputting the information as voice using the speaker 160.

Figure 8:
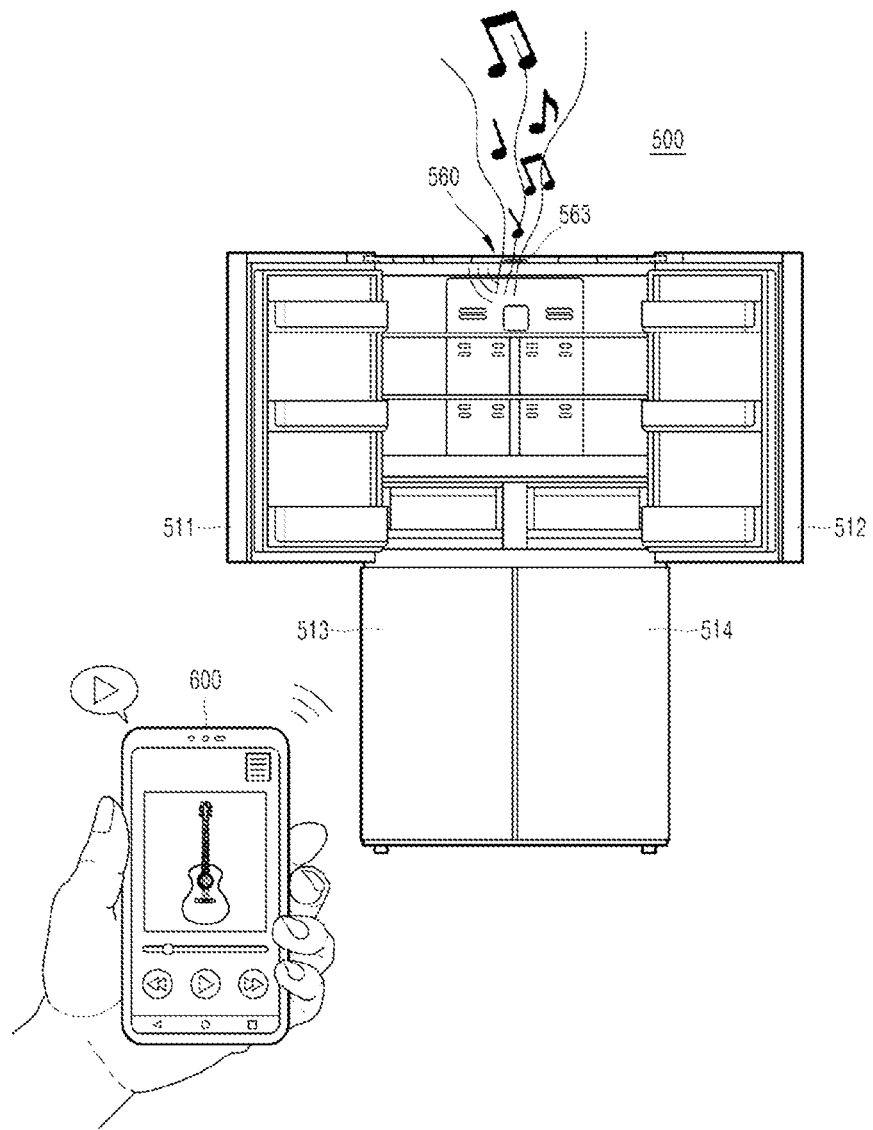
FIG. 8 is a diagram illustrating an example in which sound is played back when a door of a refrigerator with a sound reproducing capability according to an embodiment of the present disclosure is open.

FIG. 8 is a diagram illustrating an example in which sound is played back when a door of a refrigerator with a sound reproducing capability according to an embodiment of the present disclosure is open.

Here, a refrigerator 500 of FIG. 8 may receive a sound signal via a communication with a user terminal 600, and may output sound.

The refrigerator 500 of FIG. 8 may include a first vibration module installed on an inner surface of an outer plate that forms a front surface of one door among doors 511, 512, 513, and 514, and further include a second vibration module 563 attached to an outer surface of a panel that forms a storage unit 560 of the refrigerator 500.

The second vibration module 563 is attached to an outer surface of a panel that forms a space of the storage unit 560 to transfer vibration to the panel, so that sound may be outputted inside a storage space.

When a door of the refrigerator 500 is closed, the first vibration module installed on an inner surface of an outer plate of the door may operate so that sound may be outputted to the outside of the refrigerator 500. When the door of the refrigerator 500 is opened, the second vibration module 563 disposed on the outer surface of the panel of the storage unit 560 may operate so that sound may be outputted inside the storage space 560. Typically, a user is outside the refrigerator 500 when the door is closed, and the user is looking inside the storage unit 560 of the refrigerator 500 when the door is opened, and thus sound may be outputted at an optimum position which enables transfer of sound to the user through a change in a position of a sound output.

In addition, the second vibration module 563 attached to the outer surface of the panel of the storage unit 560 may perform an operation of strengthening a defrost function.

When frost forms and attaches to inner surfaces of the storage unit 560, a transfer of a cooling airflow of the refrigerator 500 may be hindered, thereby significantly reducing cooling efficiency. Thus, the refrigerator 500 may perform the defrost function to remove frost by, for example, heating.

When the defrost function is performed, the second vibration module 563 may generate vibration to remove frost attached to an inner surface of the storage unit 560. Through the above operation, the second vibration module 563 may perform a function of removing frost generated in the refrigerator as well as a function of outputting sound.

Also, the second vibration module 563 may be positioned such that vibration may be transmitted to, for example, a cooling pipe, and may perform a function of removing frost formed in the cooling pipe.

Meanwhile, vibration modules that vibrate the inside of the storage unit 560 of the refrigerator 500 may be disposed in a plurality of positions. When the defrost function using a vibration module is performed based on the above configuration, a position where frost is generated may be analyzed by, for example, an image sensor disposed in the storage unit 560, and a vibration module which is closest to the position where the frost is generated may be controlled to operate to strengthen the defrosting operation.

Figure 9:
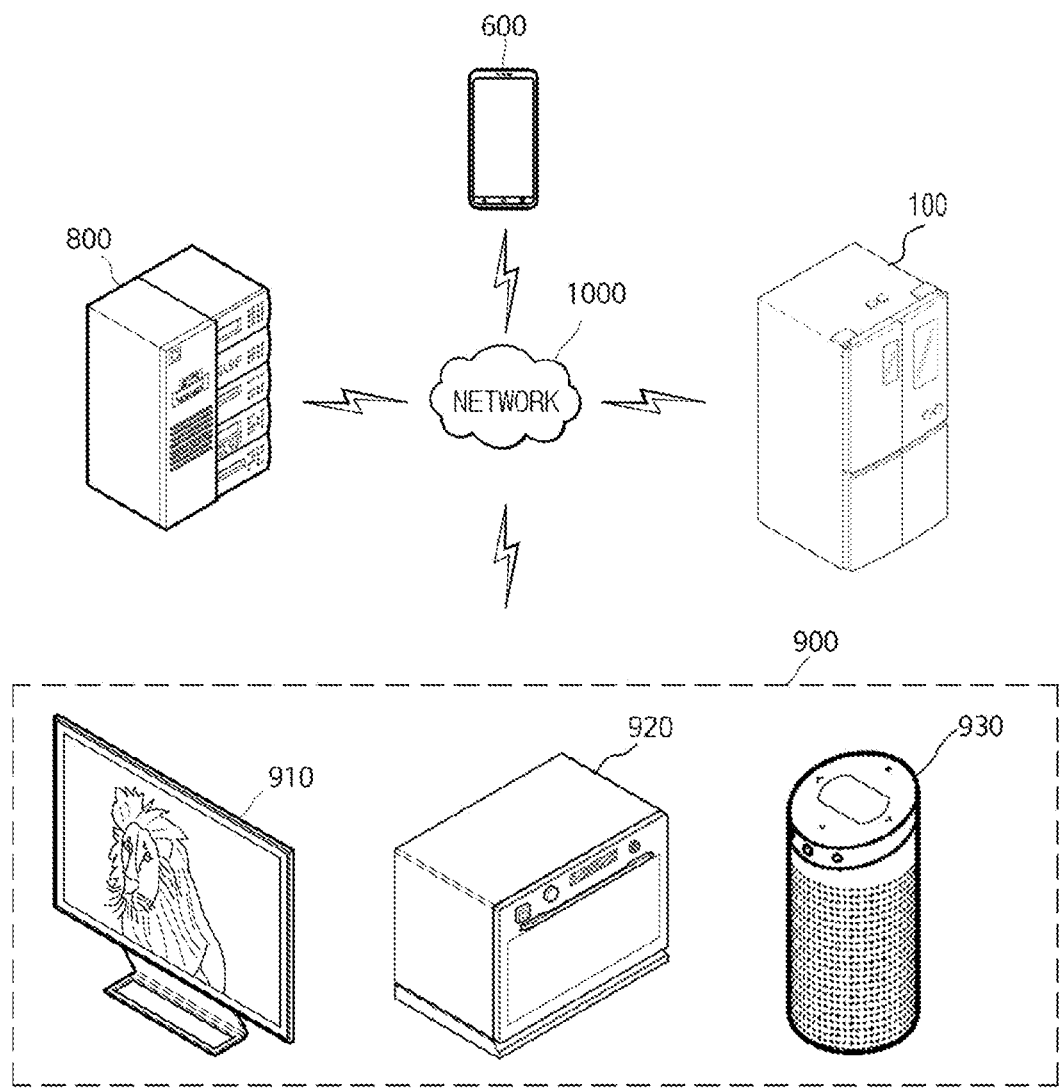
FIG. 9 is a diagram illustrating an environment in which a refrigerator with a sound reproducing capability according to an embodiment of the present disclosure is connected to other devices.

FIG. 9 is a diagram illustrating an environment in which a refrigerator with a sound reproducing capability according to an embodiment of the present disclosure is connected to other devices.

A refrigerator 100 may communicate with a user terminal 600 and an external server 800 installed to control Internet of Things (IoT) via a network 1000. Such communication may be performed based on a 5G communication protocol, and external devices 900 having home applications installed in home, such as a TV 910, an oven 920, and an AI speaker 930, in addition to the refrigerator 100, may also participate in an IoT environment via the network 1000.

Information about the type of food stored in the refrigerator 100 as described above may be transmitted to the server 800 via the network 1000, and the server 800 may transmit a recommended food menu according to a food type to the TV 910 and may allow an image of a recipe of the corresponding food menu to be outputted. In addition, the server 800 may instruct the oven 920 to prepare for cooking the corresponding menu in advance. Further, the server 800 may control the AI speaker 930 to provide a notification of a recipe of the recommended food menu using voice.

The refrigerator with the sound reproducing capability as described above may allow sound to be played back at a lower cost than a refrigerator to which a conventional speaker is applied, and may enable various sound outputs depending on a position where a vibration module is attached.

In addition, the vibration module may strengthen the defrost function as well as the sound output, thereby further enhancing the original function of the refrigerator.

Although all elements constituting the embodiments of the present disclosure are described as integrated into a single one or to be operated as a single one, the present disclosure is not necessarily limited to such embodiments. According to embodiments, all of the elements may be selectively integrated into one or more and be operated as one or more within the object and the scope of the embodiments.

While the foregoing has been given by way of embodiments of the present disclosure, all such and other modifications and variations thereto as would be apparent to those skilled in the art are deemed to fall within the broad scope and ambit of this disclosure as is set forth herein.

What is claimed is:

1. A refrigerator with a sound reproducing capability, the refrigerator comprising:
   a cabinet forming an exterior of the refrigerator, the cabinet having an upper surface portion, a lower surface portion, a side surface portion, and a rear surface portion;
   a door coupled to the cabinet;
   a first vibrator attached to an inner surface of one of the door, the upper surface portion, the lower surface portion, the side surface portion, or the rear surface portion;
   a controller configured to control vibration of the first vibrator; and
   a second vibrator attached to an inner surface of another of the door, the upper surface portion, the lower surface portion, the side surface portion, or the rear surface portion,
   wherein the first vibrator vibrates the inner surface of the one of the door, the upper surface portion, the lower surface portion, the side surface portion, or the rear surface portion so as to output sound, and
   wherein the upper surface portion, the lower surface portion, the side surface portion, the rear surface portion or a front surface of the door operates as a diaphragm for outputting sound,
   wherein the cabinet includes a storage space,
   wherein the controller is configured to operate the first vibrator when the refrigerator performs a defrosting operation to remove frost generated in a part of the refrigerator,
   wherein the controller is configured to analyze positions where frost is generated by an image sensor disposed in the storage space, and
   wherein the controller is configured to selectively operate one of the first and second vibrators which is closest to the positions where the frost is generated when performing the defrosting operation.

2. The refrigerator according to claim 1, further comprising a frame configured to mechanically support the first vibrator such that the first vibrator is fixed while being in contact with the inner surface of the one of the door, the upper surface portion, the side surface portion, or the rear surface portion, and
   wherein a front surface portion of the first vibrator is attached to the inner surface of the one of the door, the upper surface portion, the side surface portion, and the rear surface portion via an adhesive member.

3. The refrigerator according to claim 1, further comprising:
   a power regulator configured to regulate an amount of power supplied to the first vibrator; and
   a temperature sensor configured to sense a temperature in the refrigerator,
   wherein the power regulator is configured to control the power supplied to the first vibrator to be less than or equal to a threshold value, and is configured to reduce the power supplied to the first vibrator when a temperature variation in the refrigerator sensed by the temperature sensor is greater than or equal to a predetermined value.

4. The refrigerator according to claim 1, wherein the cabinet includes a storage space for storing food,
   wherein a sensor configured to sense an introduction of food is disposed in the storage space, and
   wherein the controller is configured to record a point in time at which the food is introduced, and to generate a warning signal using the first vibrator when the introduced food has been stored in the storage space for a predetermined period of time or longer.

5. The refrigerator according to claim 1, further comprising a communicator configured to communicate with an external device via a wireless network,
   wherein the cabinet includes a storage space for storing food,
   wherein an image sensor configured to sense a shape of stored food is disposed in the storage space, and
   wherein the controller is configured to transmit the shape of the food sensed by the image sensor to the external device via the communicator, and to receive, from the external device, a menu of possible dishes for cooking recommended according to a type of the food determined based on the shape of the food by the external device.

6. The refrigerator according to claim 1, further comprising:
   a communicator configured to communicate with an external device via a wireless network; and
   a microphone capable of receiving a voice of a user,
   wherein the communicator is configured to transmit the voice of the user received via the microphone to an external device capable of recognizing a voice request, and to receive a response to the voice request recognized by the external device, and
   wherein the controller is configured to output the response via the first vibrator.

7. The refrigerator according to claim 1, wherein the cabinet includes a storage space for storing food,
   wherein a transparent glass panel is disposed on at least a partial surface of the door such that at least a part of the storage space is observable from outside of the refrigerator,
   wherein the first vibrator is disposed below the glass panel, on the inner surface of the door, and
   wherein a vibration absorbing member is disposed between the glass panel and a portion of the door where the first vibrator is disposed, and the first vibration absorbing member is configured to prevent vibration generated from the first vibrator from being transmitted to the glass panel.

8. The refrigerator according to claim 1, further comprising a second vibrator attached to the inner surface of another of the door, the upper surface portion, the lower surface portion, the side surface portion, or the rear surface portion.

9. The refrigerator according to claim 1, wherein the first vibrator includes a first vibration surface spaced from a second vibration surface, each of the first vibration surface and the second vibration surface being attached to the inner surface of the one of the door, the upper surface portion, the lower surface portion, the side surface portion, or the rear surface portion.

10. The refrigerator according to claim 1, wherein the first vibrator includes:
    a based attached to the inner surface of the one of the door, the upper surface portion, the lower surface portion, the side surface portion, or the rear surface portion;
    a centered vibration portion; and
    a case attached to the base.

11. The refrigerator according to claim 1, wherein a vibration strength of the first vibrator is determined by a trained model trained through machine learning.

12. A refrigerator with a sound reproducing capability, the refrigerator comprising:
    a storage unit configured to form a storage space for storing food, the storage unit having an upper surface portion, a lower surface portion, a side surface portion, and a rear surface portion;
    a door configured to open and close the storage space, the door having an outer plate forming a front exterior of the refrigerator;
    a first vibrator disposed in contact with an inner surface of the outer plate of the door, and configured to generate sound by vibrating the outer plate;
    a second vibrator attached to an inner surface of one of the upper surface portion, the lower surface portion, the side surface portion, or the rear surface portion; and
    an image sensor configured to obtain position images where frost is generated in the storage unit,
    wherein the outer plate of the door operates as a diaphragm for outputting sound, and
    wherein the first vibrator and the second vibrator are configured to selectively operate to perform a defrosting operation to remove frost generated in a part of the refrigerator according to the position images.

13. The refrigerator according to claim 12, wherein the first vibrator is configured to operate to reproduce sound outside the refrigerator via the door when the door is closed, and the second vibrator is configured to operate to reproduce sound inside the storage space when the door is open.

14. The refrigerator according to claim 12, further comprising a communicator configured to communicate with at least one of a server, a home appliance or a user terminal via a wireless network.

15. The refrigerator according to claim 14, wherein the home appliance is one of a television, an oven, or a speaker.

16. The refrigerator according to claim 12, wherein a vibration strength of the first vibrator is determined by a trained model trained through machine learning.

* * * * *